(12) United States Patent
Nomura

(10) Patent No.: US 7,901,163 B2
(45) Date of Patent: Mar. 8, 2011

(54) GUN DRILL

(75) Inventor: Takuji Nomura, Amagasaki (JP)

(73) Assignee: Unitac, Inc., Hyogo (JP)

( * ) Notice: Subject to any disclaimer, the term of this patent is extended or adjusted under 35 U.S.C. 154(b) by 227 days.

(21) Appl. No.: 12/065,323

(22) PCT Filed: Nov. 30, 2006

(86) PCT No.: PCT/JP2006/323971
§ 371 (c)(1),
(2), (4) Date: Feb. 29, 2008

(87) PCT Pub. No.: WO2007/063953
PCT Pub. Date: Jun. 7, 2007

(65) Prior Publication Data
US 2009/0148247 A1    Jun. 11, 2009

(30) Foreign Application Priority Data

Dec. 2, 2005  (JP) ................................. 2005-348683

(51) Int. Cl.
*B23B 51/00* (2006.01)
(52) U.S. Cl. .............. 408/59; 409/83; 409/144; 409/145
(58) Field of Classification Search .................... 408/57, 408/59, 79–83, 144, 199, 227, 229, 230, 408/145
See application file for complete search history.

(56) References Cited

U.S. PATENT DOCUMENTS 2,418,021 A * 3/1947 Fleischer ..................... 408/59
4,160,616 A * 7/1979 Winblad ...................... 408/144
5,221,165 A * 6/1993 Goszczynski ................. 408/1 R
5,551,812 A * 9/1996 Basteck ........................ 408/199
5,921,727 A * 7/1999 Depperman ................. 408/144
5,967,707 A * 10/1999 Larson .......................... 408/1 R
6,299,391 B1 * 10/2001 Endsley et al. ................ 408/83
6,913,428 B2 * 7/2005 Kress et al. ................... 408/144

FOREIGN PATENT DOCUMENTS

| EP | 824050 A1 * | 2/1998 |
| JP | S36-145 | 1/1961 |
| JP | 62-42916 U1 | 3/1987 |
| JP | 62-188613 | 8/1987 |

OTHER PUBLICATIONS

CRC Handbook of Chemistry and Physics, Editor in Chief: Robert C. Weast, The Chemical Rubber Company, published 1964, p. F-15.*

* cited by examiner

*Primary Examiner* — Daniel W Howell
(74) *Attorney, Agent, or Firm* — Womble Carlyle

(57) ABSTRACT

A gun drill having excellent cutting efficiency, having high deep-hole drilling efficiency, and having a prolonged blade service life has a cutter head having a coolant discharge port communicating with a coolant supplying path at the distal end face at the distal end of a hollow shank portion having a cutting chip discharge groove, whose section along the lengthwise direction is V-shaped, on the outer surface and having the interior thereof made into a coolant supplying path, wherein a blade portion of the cutter head is made of cemented carbide alloy, and at the same time, the guide pads and that are brought into sliding contact with the inner circumference of a cutting bore are composed of a dissimilar material having higher hardness than the cemented carbide alloy.

18 Claims, 3 Drawing Sheets

GUN DRILL

FIELD OF THE INVENTION

The present invention relates to a gun drill used for deep-hole drilling.

BACKGROUND OF THE INVENTION

Although various systems such as a gun drilling system, an ejector system (double tube system), a single tube system, etc., have been publicly known as a deep-hole drilling system, the gun drilling system is suitable for deep-hole drilling of a small diameter. That is, the gun drill system generally employs a gun drill having a cutter head, the outer cross section of which is a notched circle (⅔ through ¾ circle), provided at the distal end of a hollow shank portion having the same notched circle, carries out cutting while supplying coolant, which is supplied through the interior of the hollow shank portion, from a coolant discharge port at the distal end face of the cutter head to a cutting portion, and discharges cutting chips, which are generated in line with the cutting, to the exterior through a cutting chip discharge groove whose section is V-shaped, along the lengthwise direction of the outer circumference of the hollow shank portion together with the coolant, wherein since the coolant supplying pressure is determined by the tool length even if the cutting hole becomes deep, the gun drill system is suitable for deep-hole drilling of a small diameter.

Conventionally, as the above-described gun drill, one for which a cutter head consisting of a solid cemented carbide alloy is brazed to the distal end of a steel-made hollow shank portion is generally used. In addition, it is general that, in particular, in a small-diameter gun drill, if the blade is worn to some degree, the blade is re-used after polishing the same.

However, in recent years, it is keenly desired that the efficiency of cutting including deep-hole drilling is increased, and at the same time, labor and cost required for improvement of durability and maintenance of cutting tools and other components are reduced. In this connection, the cutting efficiency and durability are insufficient with the conventional gun drill. In particular, labor and time required for polishing the cutter having a small diameter become a problem.

The present invention was developed in view of the above-described situations, and it is therefore an object of the invention to provide a gun drill having excellent cutting efficiency, by which the cutting rate can be further significantly improved in comparison with conventional gun drills, and having a prolonged blade service life, capable of reducing the frequency of polishing for re-use in a case of a small diameter, and capable of accordingly reducing labor and time.

SUMMARY OF THE INVENTION

In order to achieve the above-described object, if a gun drill according to the first aspect of the invention is shown by reference numerals of the drawings, the gun drill is provided with cutter heads 3A through 3C having a coolant discharge port communicating with a coolant supplying path 12 at the distal end face 3a at the distal end 1b of a hollow shank portion 1 having a cutting chip discharge groove 11, whose section along the lengthwise direction is V-shaped, on the outer surface and having the interior thereof made into the coolant supplying path 12, wherein a blade portion 32 of the cutter heads 3A through 3C are made of cemented carbide alloy W, and at the same time, at least a part of the slide-contacting portion to the inner circumference of a cutting bore of the cutter heads 3A through 3C excluding the blade portion 32 is composed of a harder material than the cemented carbide alloy W.

According to the second aspect of the invention, in the gun drill according to the first aspect, the above-described dissimilar material composes a guide pad adhered to and fixed at the outer circumferential portion of the cutter head.

According to the third aspect of the invention, in the gun drill according to the first aspect or the second aspect thereof, the above-described dissimilar material is composed of at least one type selected among sintered ceramic, micro-crystal diamond sintered body, and cermet.

According to the fourth aspect of the invention, in the gun drill according to the third aspect thereof, the sintered ceramic is a sintered body mainly composed of silicon nitride or cubic crystal boron nitride.

According to the fifth aspect of the invention, in the gun drill according to the third aspect or the fourth aspect thereof, the above-described sintered ceramic C is composed by being adhered to and fixed at the matrix (cemented carbide alloy W) of cutter heads 3A and 3B by a metallizing processing method.

According to the gun drill as set forth in the first aspect of the invention, since, in a deep boring process, the cutter head is brought into sliding contact with the inner circumference of a cutting bore at the peripheral portion thereof having higher hardness than a cemented carbide alloy and having less toughness while cutting a workpiece by means of the blade portion, made of a cemented carbide alloy, of the cutter head, and the rigid slide-contacting portion thereof stably receives a reaction force in line with cutting, minute shake or swing such as vibrations of the cutter head can be prevented from occurring, and the cutting rate can be remarkably increased to achieve a high working efficiency. Further, the blade portion can be prevented from being broken or worn, wherein since the service life of the blade can be prolonged, and the frequency of re-polishing for re-use of a small-diameter cutter head can be remarkably reduced, the labor, time and costs therefor can be greatly reduced.

According to the second aspect of the invention, since the guide pad of the cutter head is composed of the above-described dissimilar material, it becomes possible to manufacture the corresponding cutter head simply and easily in view of structure.

According to the third aspect of the invention, since the dissimilar material is sintered ceramic or cermet, there are advantages in that, in comparison with a gun drill the entirety of the cutter head of which is made of a cemented carbide alloy, the cutting rate can be remarkably increased and the service life of the blades can be extended.

According to the fourth aspect of the invention, there are advantages in that, since the above-described sintered ceramic is composed of a sintered body of a specified component, the cutting rate can be increased, and the service life of the blades can be extended.

According to the fifth aspect of the invention, the component of the above-described sintered ceramic is remarkably firmly adhered to and fixed at the matrix of the cutter head.

BRIEF DESCRIPTION OF THE DRAWINGS

For a complete understanding of the above and other features of the invention, reference shall be made to the following detailed description of the preferred embodiments of the invention and to the accompanying drawings, wherein.

DETAILED DESCRIPTION OF THE PREFERRED EMBODIMENT

Figure 4:
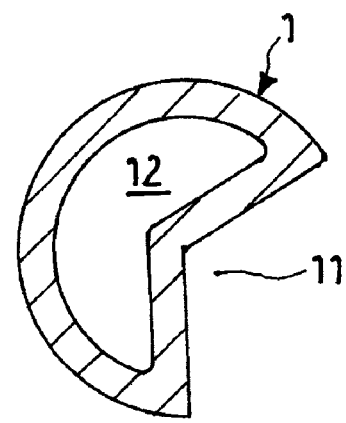
FIG. 4 is a sectional view taken along the line II-II of FIG. 1.
Figure 5:
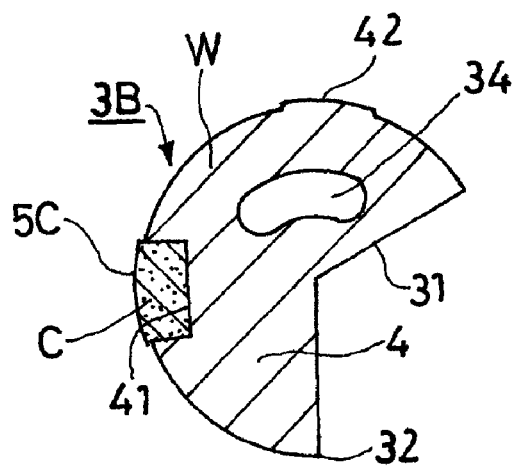
FIG. 5 is a cross sectional view of a cutter head in a gun drill according to Embodiment 2 of the present invention.
Figure 6:
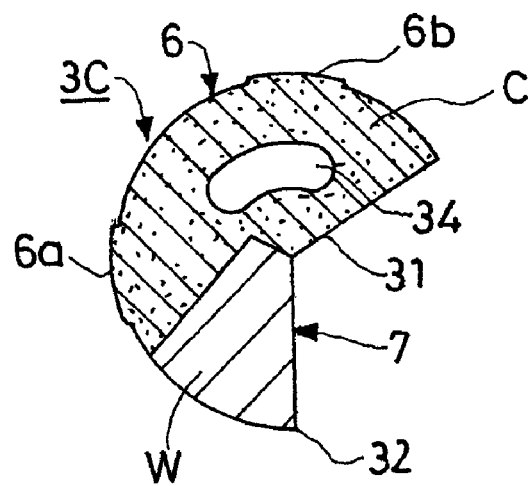
FIG. 6 is a cross sectional view of a cutter head in a gun drill according to Embodiment 3 of the present invention.

Hereinafter, a detailed description is given of embodiments of a gun drill according to the present invention with reference to the accompanying drawings. FIG. 1 through FIG. 4 show Embodiment 1, FIG. 5 shows Embodiment 2, and FIG. 6 shows Embodiment 3, respectively.

Figure 1:
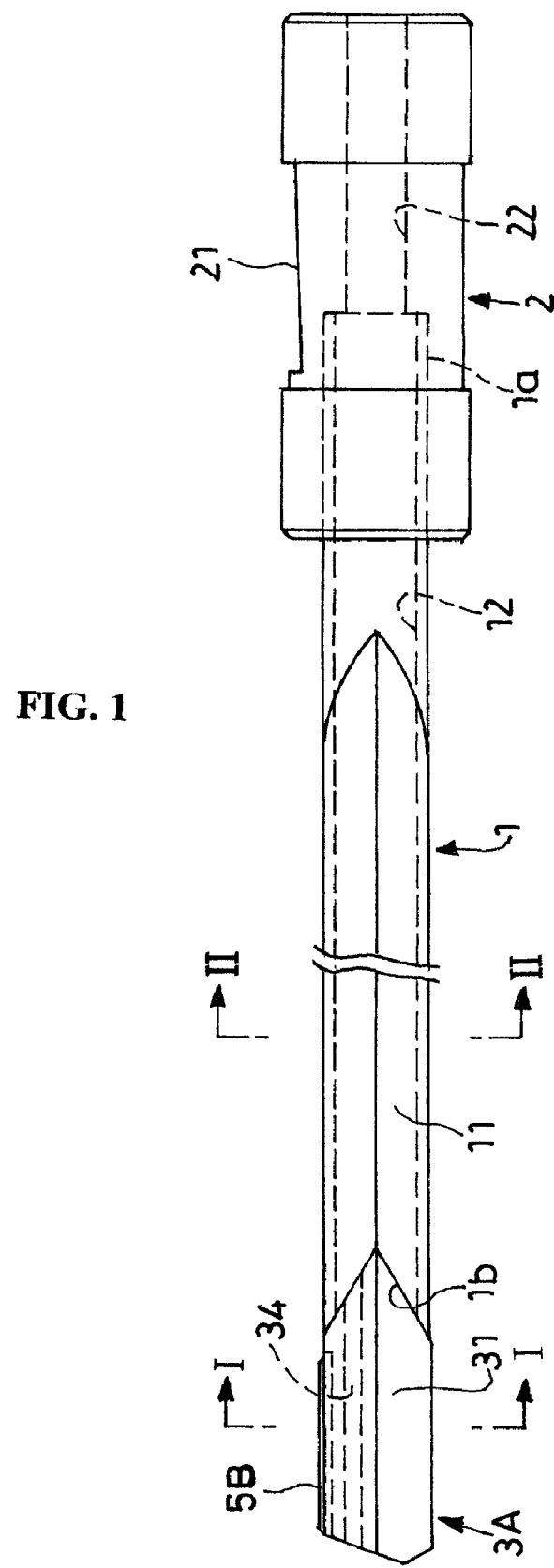
FIG. 1 is a side elevational view showing a gun drill according to Embodiment 1 of the present invention.

As shown in FIG. 1, a gun drill according to Embodiment 1 is composed of a hollow shank portion 1, a large-diameter cylindrical driver portion 2 where the proximal end portion 1*a* of the hollow shank portion 1 is adhered to and fixed at, and a cutter head 3A for drilling, which is brazed to the V-shaped cut distal end 1*b* of the hollow shank portion 1.

The hollow shank portion 1 is composed of a pipe material. However, the cross section thereof is formed to be a ⅔ circle by dies processing as shown in FIG. 4, excluding the proximal end portion 2*a* side, and a cutting chip discharge groove 11 is formed along the lengthwise direction, the section of which is V-shaped at the outer side thereof, and the internal space thereof forms a coolant supply path 12.

The driver portion 2 is a portion that is grasped and held by a chuck of a rotating drive shaft (not illustrated), etc., and receives a rotating drive force, and the portion has a flattened portion 21 for grasping and holding on the circumferential face, and at the same time, is provided with a coolant supply path 22 communicating with a coolant supply path 12 of the hollow shank portion 1 along the centerline.

Figure 2:
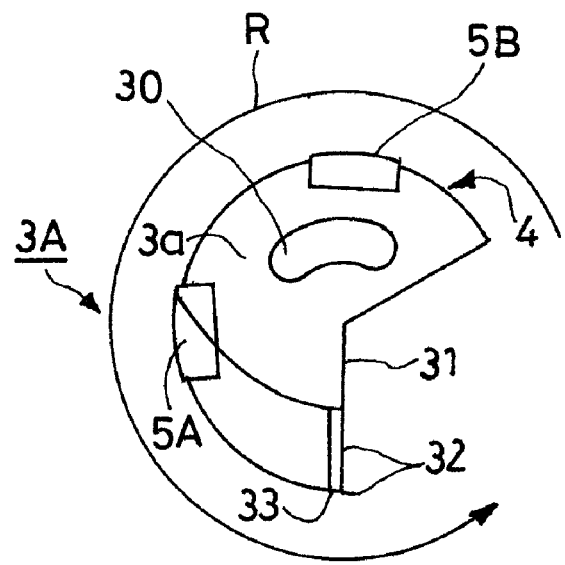
FIG. 2 is a front elevational view of a cutter head of the same gun drill.
Figure 3:
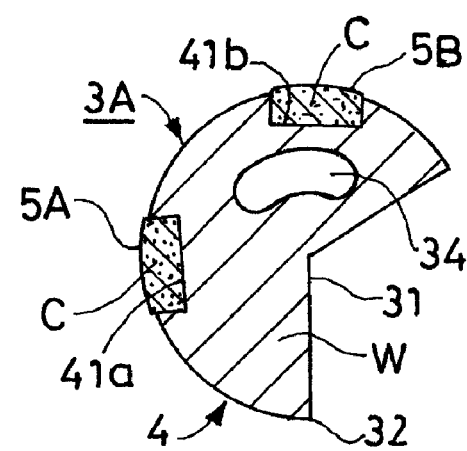
FIG. 3 is a sectional view taken along the line I-I of FIG. 1.

The cutter head 3A is composed of a head main body 4, the cross section of which forms a ⅔ circle corresponding to the hollow shank portion 1 as shown in FIG. 2 and FIG. 3, and thick plate-shaped guide pads 5A and 5B adhered to and fixed at two points of the outer circumferential portion of the head main body 4, the cross section of which is hemicylindrical, being long in the axial direction, wherein a cocoon-shaped coolant discharge port 30 is made open at the distal end face 3*a*, and at the same time, the notched portion the cross-section of which is a ⅔ circle, forms a groove portion 31 communicating with the cutting chip discharge groove 11 of the hollow shank portion 1, wherein one side edge of the corresponding groove portion 31 is made into a blade portion 32, and when carrying out deep boring, the notched portion is devised to be driven and rotated in the direction of the arrow R (clockwise) in FIG. 2. Also, reference numeral 33 denotes a margin that forms an inclined surface or an arc-shaped surface having a width of 0.2 through 1 mm along the blade portion 32.

In this connection, the head main body 4 is formed of a cemented carbide alloy W made mainly of WC—Co based tungsten carbide, wherein a coolant lead-out path 34, the cross-section of which is cocoon-shaped, communicating with the coolant discharge portion 30 and the coolant supply path 12 of the hollow shank portion 1 is penetrated in the axial direction thereof, and recessed portions 41*a* and 41*b* are provided therein, by which the guide pads 5A and 5B are fitted to the outer circumferential portion. Also, the center of the recessed portion 41*a* is located at a position forming an angle of 85° from the position of the blade portion 32 to rearward of the rotation direction of the head, and the center of the recessed portion 41*b* is located at the opposite side of the diametrical direction in regard to the blade 32.

The guide pads 5A and 5B are made of sintered ceramic C having higher hardness than that of the cemented carbide alloy W. The guide pads 5A and 5B are fitted in the recessed portions 41*a* and 41*b* of the head main body 4, respectively, and are adhered and fixed therein by a metallizing processing method.

When carrying out deep-hole drilling with the gun drill constructed as described above, coolant supplied through the internal coolant supply paths 12 and 22 of the hollow shank portion 1 and the driver portion 2 are guided to the coolant lead-out path 34 of the cutter head 3A, and is supplied from the coolant discharge port 30 of the distal end face 3*a* to the cutting portion, and at the same time, a workpiece is cut by the blade portion 32, made of a cemented carbide alloy W, of the rotating and driven cutter head 3A, and cutting chips generated inline with the cutting are discharged outside through the groove portion 31 of the cutter head 3A and the cutting chip discharge groove 11 of the hollow shank portion 1 together with the coolant.

In this connection, during cutting, the cutter head 3A is brought into contact with the inner circumferential face of a cutting bore on the surfaces of the guide pads 5A and 5*b* in a sliding state. However, since the guide pads 5A and 5B are made of sintered ceramic C having higher hardness than that of the cemented carbide alloy W and having less toughness, the rigid slide-contacting portion, in particular, the slide-contacting portion of the guide pad 5A side stably receives a reaction force generated in line with cutting. Therefore, minute shake or swing such as vibrations of the cutter head 3A in line with machining can be prevented from occurring, and the cutting efficiency is remarkably improved by stabilization of the cutting state of a workpiece by the blade portion 32, wherein the cutting rate is remarkably increased to achieve high machining efficiency, and the blade portion 32 is prevented from being broken and worn. Therefore, the service life of the blades can be remarkably extended, and in particular, the frequency of re-polishing for re-use of a small-diameter gun drill can be remarkably reduced, labor, time and costs therefor can be greatly reduced.

A sintered ceramic C that composes the guide pads 5A and 5B may be a sintered body obtained by sintering powder such as oxide, nitride, carbide, etc., the hardness of which is made higher than that of a cemented carbide alloy W. For example, boron nitride-based, silicon nitride-based, titanium carbide-based, alumina-based ceramics are representative as the sintered ceramic. In particular, a silicon nitride sintered body and a cubic crystal boron nitride sintered body may be favorably listed.

That is, in a gun drill using a silicon nitride sintered body as the guide pads 5A and 5B, it is found that the cutting rate can be epochmakingly increased by four times in comparison with a prior art gun drill in which the cutter head is made of solid cemented carbide alloy W, and the service life of the blade portion is remarkably increased. Also, in a gun drill using a cubic crystal boron nitride sintered body, remarkably high cutting accuracy can be obtained particularly in cases where a workpiece is aluminum and its alloy in comparison with a gun drill in which the entire cutter head is made of cemented carbide alloy W, and at the same time, where the workpiece is a high hardness material such as quenched steel, it is found that the service life of the blades can be remarkably extended.

Further, the metallizing processing method utilized to adhere and fix the guide pads 5A and 5B, which are made of such sintered ceramic C, to the head main body 4 has been known as a technology for cementing ceramic and a metallic material together, for which brazed jointing is generally impossible. By coating an active metal paste such as a titanium alloy on the surface of ceramic and processing it under a high temperature and vacuum state, the surface of the ceramic is metallized, and the metallized surface portion is brazed to a mating metal material. However, in the case of cutter head 3A of the gun drill, the sintered ceramic C of the guide pads 5A and 5B is cemented to the cemented carbide alloy W of the head main body 4 by a metallizing process, wherein the cemented portion is very minute and has high strength.

Although, in the gun drill according to Embodiment 1 described above, two guide pads 5A and 5B of the cutter head 3A are made of sintered ceramic C, the gun drill according to the present invention may be such that the blade portion of the cutter head is made of a cemented carbide alloy W, and at least a part of the slide-contacting portion, in regard to the inner circumference of the cutting bore, of the cutter head excluding the blade portion is composed of a dissimilar material having higher hardness than the corresponding cemented carbide alloy W. However, as such a dissimilar material, cermet and micro-crystal diamond sintered body D (refer to FIG. 7) described later are preferable in addition to the above-described sintered ceramic C. In particular, with cermet, favorable results can be obtained in view of both the cutting rate and service life of the blade portion.

In addition, the slide-contacting portion made of a dissimilar material may be provided at one point or three or more points on the circumferential surface of the cutter head. However, it is highly recommended that the slide-contacting portion at the circumferential surface portion that receives at least a reaction force of cutting by the blade portion 32, that is, in an angular range from 70° through 100° from the position of the blade portion 32 to rearward of the rotation direction of the head is composed of the corresponding dissimilar material.

For example, in the cutter head 3B of a gun drill according to Embodiment 2 shown in FIG. 5, the head main body 4 made of a cemented carbide alloy W is provided with a recessed portion 41 for which the position forming an angle of 85° from the blade portion 32 position to rearward of the rotation direction of the head is made as the center, and a guide pad 5C made of sintered ceramic C having higher hardness than that of the cemented carbide alloy W is adhered to and fixed in the recessed portion 41 by means of a metallizing process. However, a slide-contacting portion 42 brought about by a swell portion of the corresponding head main body 4 is formed at the opposite side in the diametrical direction of the blade portion 32. In addition, the guide pad 5C may be composed of cermet.

Further, although it is necessary to form the blade portion 32 of the cutter head of a cemented carbide alloy W to give it toughness as a cutting blade, portions composed of a dissimilar material having higher hardness than that of the cemented carbide alloy W may compose not only the slide-contacting portion such as the guide pads 5A to 5C of the cutter heads 3A and 3B as in Embodiments 1 and 2 but also a part or major parts of the head main body including the slide-contacting portion. For example, in the cutter head 3C of a gun drill according to Embodiment 3 shown in FIG. 6, the head main body 6 including the slide-contacting swell portions 6a and 6b is composed of sintered ceramic C, and a blade edge member 7, the cross-section of which is wedge-shaped, made of a cemented carbide alloy W including the blade portion 32 is adhered to and fixed to the head main body 6 by a metallizing process.

Further, in the gun drill according to the present invention, at least a part of the slide-contacting portion, to the inner circumference of a cutting bore, of the cutter head excluding the blade portion may be composed of a micro-crystal diamond sintered body. That is, since such a micro-crystal diamond sintered body has higher hardness than the cemented carbide alloy W and has less toughness, the rigid slide-contacting portion stably receives a reaction force generated in line with cutting as in the gun drill employing sintered ceramic C and cermet for the slide-contacting portion as in the above-described Embodiments 1 through 3, wherein the cutting state is stabilized to achieve further improvement of the cutting efficiency, the cutting rate can be epochmakingly increased, high machining efficiency can be achieved, and the service life of the blade portion can be extended to a large extent.

Such a micro-crystal diamond sintered body is generally obtained as a multi-crystal artificial diamond layer in which micro-crystal diamond is densely sintered on the surface of a matrix of a cemented carbide alloy by an ultrahigh pressure and high temperature technology. Therefore, for example, in the case of the guide pads 5A through 5C of the cutter heads 3A and 3B in the gun drill according to Embodiments 1 and 2 described above, as shown in FIG. 7, a thick plate-shaped component 8 will be used, in which a sintered layer 81 of a micro-crystal diamond sintered body D is secured on the surface of the matrix 80 made of a cemented carbide alloy W.

EXAMPLES

Figure 7:
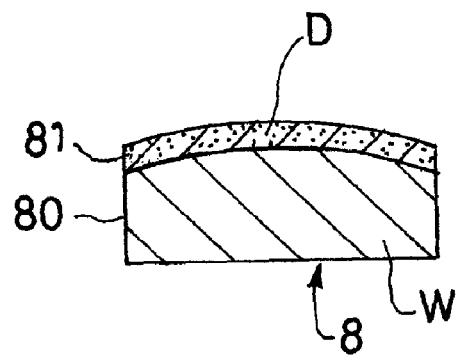
FIG. 7 is a cross-sectional view of a thick plate-shaped component used for a guide pad of the cutter head in a gun drill according to the present invention.

Gun drills G1 through G3 the respective parts of which are the following dimensions and are composed of the following materials in the modes shown in FIG. 1 through 4, gun drill G4 in which the guide pads 5A and 5B are substituted by a thick plate-shaped component 8 having the surface shown in FIG. 7 made of a micro-crystal diamond sintered body, and gun drill G0 of the same composition excepting that the entirety of the cutter head is composed of a cemented carbide alloy, are used. In respective cases, non-water-soluble cutting oil is supplied as the coolant at a pressure level of 50 kg/cm$^2$ at a flow rate of 35 liters per minute, and deep-hole drilling of a calibration of 10 mm is carried out on a workpiece of S50C (cold-drawn steel, $H_B$200 through 300), wherein possible cutting rates are compared, and service lives of the respective cases are investigated based on the accumulated cutting bore depth until the blade portion reaches the wearing degree at which re-polishing thereof will be required. The results shown in Table 1 described below were obtained.

Gun Drill G1

Driver portion 1 . . . Steel-made, 55 mm long, outer diameter 25 mm, coolant supply path 8 mm in diameter, Hollow shank portion 2 . . . Steel-made, entire length 935 mm, protrusion length 905 mm from the driver portion 1, outer diameter 17.4 mm, and inner diameter 13.4 mm Cutter head main body 4 . . . Cemented carbide alloy (made by Tungaloy Corporation), 40 mm long, outer diameter 18.0 mm, and coolant discharge port area . . . 18.7 mm$^2$ Guide pads 5A, 5B . . . Silicon nitride sintered body, 30 mm long, 5 mm wide, and central portion 2 mm thick Gun Drill G2

Same as Gun Drill G1, excepting that the guide pads 5A and 5B are made of cubic crystal boron nitride sintered body [cBN content: 90% in capacity, Bonding layer: Al compound, Hardness (Hc) 3900 through 4100, and Transverse rupture strength (GPa) 1.80 through 1.90].

Gun Drill G3

Same as Gun Drill G1, excepting that the guide pads 5A and 5B are made of non-coated cermet (made of Tungaloy Corporation).

TABLE 1

| Gun Drill | Cutting rate | | Blade service life |
|---|---|---|---|
| | v (m/minute) | $f_n$ (mm/revolution) | (Accumulated cutting bore depth) |
| G0 | 100 | 0.03 | 15 m |
| G1 | 400 | 0.03 | 18 m |
| G2 | 150 | 0.03 | 16 m |
| G3 | 180 | 0.03 | 18 m |

As has been made clear from the above table, according to gun drills G1 through G3, it is understood that the cutting rate is remarkably increased, and the service life of the blade is extended to a large extent, in comparison with gun drill G0 of the conventional construction.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

DESCRIPTION OF REFERENCE NUMERALS

1 Hollow shank portion
1b Distal end
11 Cutting chip discharge groove
12 Coolant supply path
3A to 3C Cutter heads
3a Distal end face
30 Coolant discharge port
32 Blade portion
4 Head main body
5A to 5C Guide pads
6a, 6b Slide-contacting portions
C Sintered ceramics
D Micro-crystal diamond sintered body
W Cemented carbide alloy

What is claimed is:

1. A gun drill including at least one cutter head having a coolant discharge port communicating with a coolant supplying path at the distal end face at the distal end of a hollow shank portion having a cutting chip discharge groove, whose section along the lengthwise direction is V-shaped, on the outer surface and having the interior thereof made into a coolant supplying path, wherein:
a blade portion of the at least one cutter head is made of a cemented carbide alloy, and at the same time, at least a part of the slide-contacting portion to the inner circumference of the at least one cutter head excluding the blade portion is composed of a dissimilar material having higher hardness than the cemented carbide alloy; and
the slide-contacting portion comprises a swell portion formed along an outer circumferential portion of the cutter head, the swell portion being made of the same material as the blade portion.

2. The gun drill according to claim 1, wherein the dissimilar material composes a guide pad adhered to and fixed at the outer circumferential portion of the cutter head.

3. The gun drill according to claim 1, wherein the dissimilar material is composed of sintered ceramic or cermet.

4. The gun drill according to claim 3, wherein the sintered ceramic is a sintered body mainly composed of silicon nitride or cubic crystal boron nitride.

5. The gun drill according to claim 3, wherein the sintered ceramic is adhered to and fixed at the matrix of cutter heads by a metallizing processing method.

6. The gun drill according to claim 2, wherein the dissimilar material is composed of sintered ceramic or cermet.

7. The gun drill according to claim 6, wherein the sintered ceramic is a sintered body mainly composed of silicon nitride or cubic crystal boron nitride.

8. The gun drill according to claim 6, wherein the sintered ceramic is adhered to and fixed at the matrix of cutter heads by a metallizing processing method.

9. The gun drill according to claim 7, wherein the sintered ceramic is adhered to and fixed at the matrix of cutter heads by a metallizing processing method.

10. A gun drill comprising:
a generally cylindrical hollow shank portion having a V-shaped cutting chip discharge groove formed on an outer surface thereof and a coolant supply path formed in an interior thereof;
at least one cutter head mounted on the hollow shank portion, the at least one cutter head having:
a coolant discharge port formed at a distal end face of the cutter head;
a coolant lead-out path which communicates with the coolant discharge port and also with the coolant supply path of the hollow shank;
a groove portion formed on an outer surface thereof which communicates with the V-shaped cutting chip discharge groove of the hollow shank;
a blade portion made of a cemented carbide alloy; and
at least one slide-contacting portion, at least a part of which is made from a material having a hardness higher than that of the blade portion;
wherein:
the at least one slide-contacting portion comprises:
at least one guide pad fixed to an outer circumferential portion of the cutter head, the guide pad comprising a cemented carbide alloy and a micro-crystal diamond sintered body secured to a surface of said cemented carbide alloy, the micro-crystal diamond sintered body having a hardness higher than that of the blade portion.

11. A gun drill including at least one cutter head having a coolant discharge port communicating with a coolant supplying path at the distal end face at the distal end of a hollow shank portion having a cutting chip discharge groove, whose section along the lengthwise direction is V-shaped, on the outer surface and having the interior thereof made into a coolant supplying path, wherein:
a blade portion of the at least one cutter head is made of a cemented carbide alloy, and at the same time, at least a part of the slide-contacting portion to the inner circumference of the at least one cutter head excluding the blade portion is composed of a dissimilar material having higher hardness than the cemented carbide alloy; and
the slide-contacting portion comprises at least two spaced apart swell portions formed along an outer circumferential portion of a head main body of the cutter head, the head main body being made from a material having a hardness higher than that of the blade portion; and the blade portion is formed on a blade edge member that is fixed to the head main body.

12. A gun drill including at least one cutter head having a coolant discharge port communicating with a coolant supplying path at the distal end face at the distal end of a hollow shank portion having a cutting chip discharge groove, whose section along the lengthwise direction is V-shaped, on the outer surface and having the interior thereof made into a coolant supplying path, wherein:

a blade portion of the at least one cutter head is made of a cemented carbide alloy, and at the same time, at least a part of the slide-contacting portion to the inner circumference of the at least one cutter head excluding the blade portion is composed of a dissimilar material having higher hardness than the cemented carbide alloy; and the slide contacting portion comprises at least one guide pad fixed to an outer circumferential portion of the cutter head, the at least one guide pad comprising a cemented carbide alloy and a micro-crystal diamond sintered body secured to a surface of said cemented carbide alloy, the micro-crystal diamond sintered body having a hardness higher than that of the blade portion.

13. A gun drill comprising:

a generally cylindrical hollow shank portion having a V-shaped cutting chip discharge groove formed on an outer surface thereof and a coolant supply path formed in an interior thereof;

at least one cutter head mounted on the hollow shank portion, the at least one cutter head having:

a coolant discharge port formed at a distal end face of the cutter head;

a coolant lead-out path which communicates with the coolant discharge port and also with the coolant supply path of the hollow shank;

a groove portion formed on an outer surface thereof which communicates with the V-shaped cutting chip discharge groove of the hollow shank;

a blade portion made of a cemented carbide alloy; and at least one slide-contacting portion, at least a part of which is made from a material having a hardness higher than that of the blade portion;

wherein:

the at least one slide-contacting portion comprises:

a guide pad fixed to an outer circumferential portion of the cutter head, the guide pad being made from a material having a hardness higher than that of the blade portion; and a swell portion formed along an outer circumferential portion of the cutter head, the swell portion being made of the same material as the blade portion.

14. The gun drill according to claim 13, wherein:

the swell portion is formed at an opposite side of the cutter head in a diametrical direction of the blade portion.

15. A gun drill comprising:

a generally cylindrical hollow shank portion having a V-shaped cutting chip discharge groove formed on an outer surface thereof and a coolant supply path formed in an interior thereof;

at least one cutter head mounted on the hollow shank portion, the at least one cutter head having:

a coolant discharge port formed at a distal end face of the cutter head;

a coolant lead-out path which communicates with the coolant discharge port and also with the coolant supply path of the hollow shank;

a groove portion formed on an outer surface thereof which communicates with the V-shaped cutting chip discharge groove of the hollow shank;

a blade portion made of a cemented carbide alloy; and at least one slide-contacting portion, at least a part of which is made from a material having a hardness higher than that of the blade portion;

wherein:

the least one slide-contacting portion comprises at least two spaced apart swell portions formed along an outer circumferential portion of a head main body of the cutter head, the head main body being made from a material having a hardness higher than that of the blade portion; and the blade portion is formed on a blade edge member that is fixed to the head main body.

16. The gun drill according to claim 15, wherein:

the blade edge member has a wedge-shaped cross-section.

17. The gun drill according to claim 10, wherein:

the at least one slide-contacting portion comprises at least two such guide pads.

18. The gun drill according to claim 10, further comprising:

a swell portion formed along an outer circumferential portion of the cutter head, the swell portion being made of the same material as the blade portion.

* * * * *